A. A. BACKHAUS.
APPARATUS FOR THE MANUFACTURE OF ESTERS.
APPLICATION FILED OCT. 11, 1919.
1,425,624.
Patented Aug. 15, 1922.
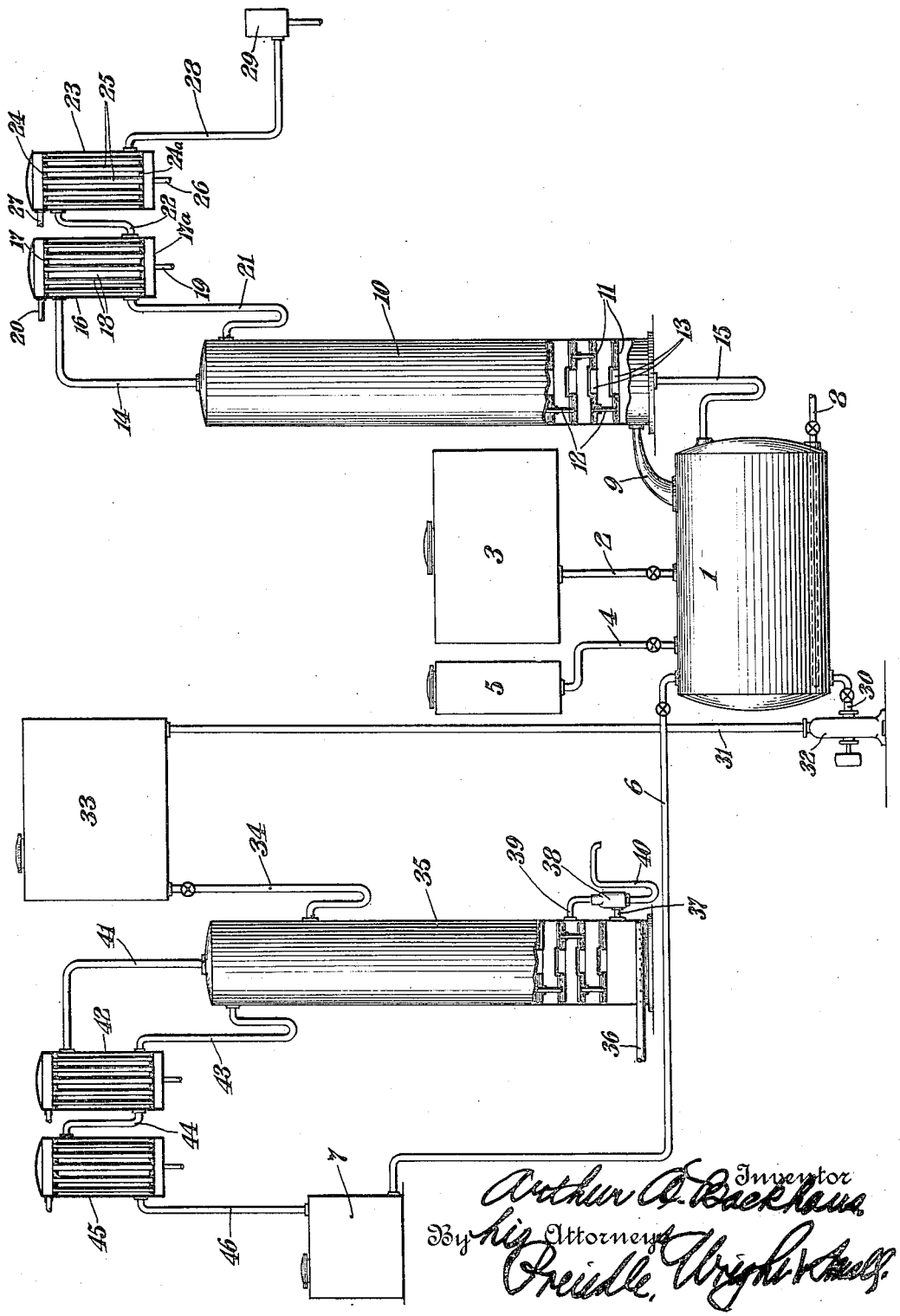

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

APPARATUS FOR THE MANUFACTURE OF ESTERS.

1,425,624.                    Specification of Letters Patent.    Patented Aug. 15, 1922.

Application filed October 11, 1919. Serial No. 329,924.

*To all whom it may concern:*

Be it known that I, ARTHUR A. BACKHAUS, a citizen of the United States, residing at Baltimore, in the State of Maryland, have invented a certain new and useful Improvement in Apparatus for the Manufacture of Esters, of which the following is a specification.

My invention relates particularly to an apparatus for producing esters of various kinds in an advantageous manner, but relates especially to the production of ethyl acetate.

The object of my invention is to provide an apparatus with which esters may be made in an expeditious manner while avoiding loss of heat as far as possible, decreasing the length of time for esterification, and producing a product which is substantially free from acids. A further object is to provide such an apparatus in which there is an effective separation of the materials driven off from the esterification chamber in the form of a vapor, and a return to said chamber of only those materials which have not yet been esterified, while the vaporized ester passes forward for subsequent condensation. Again, one of the objects of my invention is to expedite the operation of the apparatus by avoiding the return of any of the vaporized ester, and thus obviating the tendency of any such returned ester to inhibit the production of further ester.

Further objects of my invention will appear from the detailed description thereof contained hereinafter.

While my invention is capable of embodiment in many different forms, for the purpose of illustration I have shown only one way of carrying out my invention in the accompanying drawing, in which;

The figure is a diagrammatic representation of an apparatus made in accordance with my invention.

Assuming that my invention is applied to the production of ethyl acetate, as shown in the drawing, I have provided an esterification chamber 1 having a valved inlet pipe for vinegar 2 leading from a vinegar storage receptacle 3. Connected to the chamber 1, there is also a valved inlet pipe 4 for sulphuric acid communicating with a sulphuric acid storage receptacle 5. Again, attached to said chamber 1, there is a valved inlet pipe 6 for alcohol leading from an alcohol storage receptacle 7. Vinegar, sulphuric acid, and alcohol are fed into the chamber 1 in the proportion of .33 parts by weight of sulphuric acid having a strength of 50 to 66° Bé., to 10 parts by weight of vinegar having a strength of 8% acetic acid and 8/10 part by weight of ethyl alcohol having a strength of 95%. These materials are heated by means of a closed coil steam pipe 8 in the bottom of the chamber 1. The vapors formed in the chamber 1 which are comprised of ethyl acetate, alcohol, and water, as well as a little acetic acid are conveyed by a vapor pipe 9 to a rectification column 10 comprising a plurality of pans 11 having overflow pipes 12 and hooded vapor conducting pipes 13. The column 10 is maintained at a temperature of substantially 70° C., at the top thereof, so that a constant boiling mixture of ethyl acetate, alcohol, and water containing approximately 83% ethyl acetate, 9% alcohol, and 8% water, pass out of the top of the same through a vapor outlet pipe 14 while the residual materials entering the column 10 return by a trapped pipe 15 to the esterification chamber 1. The vaporized mixture of ethyl acetate, alcohol, and water pass from the pipe 14 into a dephlegmator 16 comprised of tube sheets 17 and 17$^a$ carrying tubes 18 cooled by a current of water flowing through inlet and outlet pipes 19 and 20, and the liquid formed in the dephlegmator passes by a trapped pipe 21 back to the column 10 in order to seal the pans therein while the uncondensed vapors pass by a pipe 22 to a condenser 23. This is comprised of tube sheets 24 and 24$^a$ carrying tubes 25 cooled by a current of water flowing through inlet and outlet pipes 26 and 27. The condensate flows away by a pipe 28 through a tail box 29 to any suitable point for storage.

The esterification in the chamber 1 is continued until the esterification is complete, after which the alcohol, sulphuric acid, and water, are withdrawn by a valved pipe 30 from the chamber 1, and forced through a pipe 31 by a pump 32 to a storage receptacle 33 from which the liquid is drawn off by a valved trapped pipe 34, and conveyed to an alcohol concentrating column 35 constructed the same as the column 10, except that in the bottom thereof, there is a perforated pipe 36 for supplying live steam, and at the bottom of the column 35 there is a drawoff pipe 37 leading to an overflow bottle 38 having a vapor outlet pipe 39 and a trapped discharge pipe 40 for the water and sulphuric acid. The vapors of alcohol having a strength of 80% or higher pass out by a vapor pipe 41 to a dephlegmator 42 constructed in the same manner as the dephlegmator 16 and having a trapped return pipe 43 leading to the top of the column 35. A pipe 44 conveys the uncondensed vapors from the dephlegmator 42 to a condenser 45 constructed the same as the condenser 23 from which the condensate is conveyed by a pipe 46 to the alcohol storage tank 7.

The operation of my invention will be readily understood from the preceding description. In general, however, it will be understood that the vinegar, alcohol, and sulphuric acid which are supplied to the chamber 1 from time to time in the proportions above given are heated by the steam coil, and the vapors of alcohol, ester, and water with a little acetic acid pass therefrom into the column 10 which serves to return to the esterification chamber all of the vaporized materials, except the constant boiling mixture of alcohol, ethyl acetate, and water hereinabove referred to, which is secured as a condensate and passes out through the tail box 29. The ethyl acetate thus obtained is substantially entirely freed from acetic acid by the column 10, and furthermore, the yield of ethyl acetate per unit of time is very much increased owing to the fact that the esterification is not impeded by the return of ethyl acetate to the chamber 1. When the mixture of vinegar and alcohol has been completely esterified, the remaining alcohol, sulphuric acid, and water are withdrawn to the storage chamber 33 from which they are supplied to the alcohol concentrating column 35 which serves to separate alcohol having a high degree of strength from the remaining water and sulphuric acid, the alcohol being condensed and collected in the alcohol storage tank 7 for further use in carrying out the invention, while the water and sulphuric acid are discharged as waste materials from the apparatus.

It will be understood that other acids and other alcohols may be used instead of the acetic acid or vinegar and the ethyl alcohol, as for example, methyl alcohol, formic acid, butyric acid; that salts of such acids, as for example, calcium acetate together with an additional quantity of a mineral acid as sulphuric acid, may be used in place of the free acids; and that instead of the sulphuric acid another catalyst may be used, as for example, hydrochloric acid or some other organic acid, such as formic acid.

While I have described my invention above in detail, I wish it to be understood that many changes may be made therein without departing from the spirit thereof.

I claim:

1. In combination, an esterification chamber, a rectification column connected by a conduit thereto, a concentrating column connected by a conduit to the chamber to receive liquid therefrom, and a conduit from the vapor discharge of the concentrating column leading back to the chamber.

2. In combination, an esterification chamber, a rectification column connected by a conduit thereto, a concentrating column connected by a conduit to the chamber and a storage tank in the conduit, and a conduit from the vapor discharge of the concentrating column leading back to the chamber.

3. In combination, an esterification chamber, a rectification column connected by a conduit thereto, means for supplying acids to the chamber, a concentrating column connected by a conduit to the chamber for receiving liquids therefrom, a conduit from the vapor discharge of the concentrating column leading back to the chamber, and a condenser in the latter conduit.

4. In combination, an esterification chamber, a rectification column connected by a short pipe thereto, a storage tank connected by a pipe to the chamber, a concentrating column connected to the said tank, and a conduit from the vapor discharge of the latter column leading back to the chamber.

5. In combination, an esterification chamber, a rectifying column connected thereto, a storage tank connected by a pipe to the chamber, a concentrating column connected to the tank, a condenser connected to the top of the latter column, an alcohol storage receptacle connected to the outlet of the condenser, and a pipe leading from this receptacle back to the first mentioned chamber.

6. In combination, an esterification chamber, supply tanks delivering thereto, a rectification column connected thereto, a condenser connected to the top of the rectification column, a storage tank connected to the bottom of the chamber, a concentrating column receiving liquid from the tank, a condenser at the top of the concentrating column, an alcohol storage tank receiving liquid from the condenser, and a pipe connecting it to the chamber.

In testimony that I claim the foregoing, I have hereunto set my hand this 26 day of September, 1919.

ARTHUR A. BACKHAUS.